UNITED STATES PATENT OFFICE.

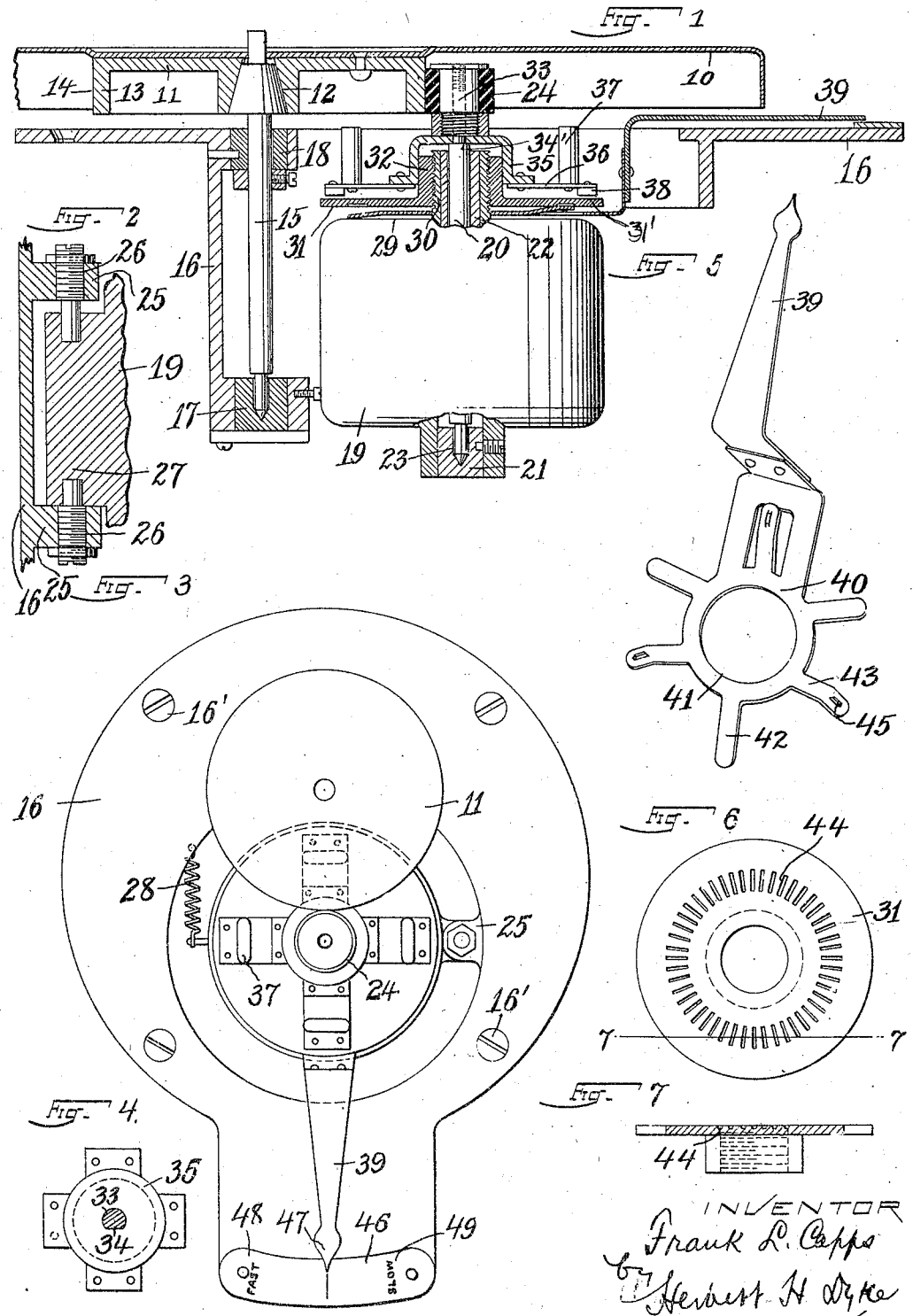

FRANK L. CAPPS, OF BROOKLYN, NEW YORK, ASSIGNOR TO PATHE FRERES PHONOGRAPH COMPANY, OF NEW YORK, N. Y., A CORPORATION OF DELAWARE.

ELECTRIC-MOTOR PHONOGRAPH.

1,290,712.    Specification of Letters Patent.    Patented Jan. 7, 1919.

Application filed January 5, 1917. Serial No. 140,668.

*To all whom it may concern:*

Be it known that I, FRANK L. CAPPS, a citizen of the United States, and a resident of Brooklyn, county of Kings, and State of New York, have invented certain new and useful Improvements in Electric-Motor Phonographs, of which the following is a specification.

My invention relates to electrically operated phonographs preferably of the type in which a flat record disk is used.

Among the objects of the invention is the provision of an electric motor drive for phonographs which is simple and quiet, which may be readily regulated for speed within a wide limit and in which all the working parts are exposed by merely removing the turntable beneath which they are located.

Another object of the invention is the provision of an electric motor drive for a phonograph in which the speed reduction from the motor to the turntable is such as to secure efficient operation at ordinary motor speed, the motor being vertically arranged beneath the turntable and the drive on a friction wheel secured to the under surface of the turntable.

Another object of the invention resides in the provision of novel governing means for the electric motor particularly adapted for use as a phonograph driving means, and the parts of which may be readily disassembled without removing the motor from its place, at any time when requisite, as for cleaning the governor parts, etc.

Another object of the invention resides in the provision of means for governing the motor which, while ordinarily adjustable through the slight range necessary for accurate control, may nevertheless be adjusted through considerable ranges without the necessity of resorting to the use of tools and by means of simple manual manipulation.

The invention further resides in the improvement of devices of this character in numerous important respects as herein pointed out, and with the foregoing and related objects in view, my invention consists in the parts, improvements and combinations herein set forth and claimed.

For the purpose of affording a clear understanding of my invention I have illustrated the preferred embodiment thereof in the accompanying drawing, but it is to be understood that the same is for illustration only, and that I am not to be limited thereto except as required by my claims, by which my invention is defined.

In the said drawing, forming a part of this specification and wherein the same reference numerals are uniformly used throughout to designate the same parts, Figure 1 is a view principally in central, vertical cross-section of the operating parts of a phonograph equipped with motor drive in accordance with my invention. Fig. 2 is a detail view showing the pivotal mounting of the motor casing. Fig. 3 is a top plan view of the apparatus shown in Fig. 1 with the turntable top plate removed. Fig. 4 is a detail plan view of the governor spider. Fig. 5 is a view in perspective of the control lever and ratchet. Fig. 6 is a bottom plan view of the governor friction plate, and Fig. 7 is a cross-sectional view taken on the line 7—7, Fig. 6.

10 is the turntable plate which has secured thereto on its lower side the combined hub and friction wheel 11 which has a tapered bore 12 to fit on the turntable post and is provided with a downwardly extending flange 13 of substantial width, the outer face 14 of which serves as a friction driving surface for the turntable. The turntable shaft or post 15 is provided with suitable bearings in the framework 16, said bearings being preferably formed in wood bushings 17 and 18 suitably supported in the framework 16 and having the slight clearance for the shaft 15 therein which is requisite for good working of metal shafts in wood bushings. Of these bushings the upper one 18 is preferably an ordinary smooth bushing, whereas the bottom bushing 17 also provides a thrust bearing for the pointed lower end of the shaft 15. The framework 16 serves as the support for all the parts of the apparatus, which makes up a complete motor and turntable unit and may be made and shipped or sold complete ready for installation in a suitable cabinet, to which it may be attached as by screws 16'.

The electric motor is of any preferred construction. Its casing is illustrated at 19 and the shaft which supplies the power for rotating the turntable at 20. This shaft likewise turns in wood bushings 21 and 22, and the lower end of the shaft 20 is preferably pointed and the thrust bearing in the bushing 21 formed to correspond therewith, the entire contact of the shaft with the lower bushing 21 being at the sharpened end thereof and the shaft being held away from contact with the side walls of the bore of the bushing with a fairly substantial clearance therebetween, as indicated at 23. The shaft 20 carries on its upper end a friction drive roll 24 of a diameter dependent upon the diameter of the friction wheel 11 and adapted to impart proper speed to the turntable at the normal rotative speed of the motor. In the form shown the speed reduction is about one to five, so that with a turntable rotated at substantially 80 turns per minute the motor is turning in the neighborhood of 400 turns per minute, which is a speed consistent with good practice, but from which variations may be made in either direction, as will be readily understood, or the inner surface of the flange 13 may be utilized as a driving surface, thus readily affording a greater speed reduction if desired, and, instead of friction drive, drive by means of gears or the like may be resorted to if desired. When the drive is by friction as illustrated, the motor casing 19 is pivotally supported to turn on an axis substantially parallel to the turntable axis, and is held toward the friction wheel or hub 11 so as to have frictional driving contact therewith. In the form shown the frame 16 has lugs 25 through which pivot screws 26 are passed which enter openings in an inward extension 27 of the motor casing, forming a vertical axis for the support of the motor casing and the spring 28 serves to draw the motor casing back and to bring the friction roll 24 into frictional driving contact with the face 14 of the hub 11, said spring having its ends secured respectively to the motor casing and to the framework 16.

With the arrangement substantially as shown, the shaft 20 being pressed against the side of the bushing 22 opposite the hub 11 and the pointed lower end being received in its socket in the bushing 21, substantially all motor vibration as is incident, for example, to the operation of alternating current motors where there is any bearing looseness, is avoided and a smooth running motor is assured.

Means are provided on the motor shaft 20 for governing its speed and therefore the speed of its turntable which is driven thereby. In the form shown the casing 19 has a substantially smooth flat top 29 and a threaded neck 30 on which is screwed a friction plate 31 having a screw-threaded hub 32. The reduced portion 33 of the shaft 20 preferably has a flat, as shown at 34, Fig. 4, and placed on said portion 33 of the shaft so as to rotate therewith and resting against the shoulder 34' is a plate or spider 35 which rotates with the shaft 20, and secured to such plate or spider, as by means of rivets, there is a plurality of flat spring members 36 each provided with an upwardly extending weight 37 and with a downwardly extending friction device 38, as a plate or washer of leather, fiber or similar material. As the plate or spider 35 is rotated the weights 37 tend to fly outward under the action of centrifugal force, bending the springs 36 downward and bringing the friction members 38 into frictional contact with the smooth top surface 31' of the relatively stationary plate 31.

Means are provided for affording adjustment for the governing action obtained by the contact of friction members 38 with the plate 31, and in the form shown there is provided for this purpose the member shown in perspective in Fig. 5, which comprises an operating lever 39 with a head 40 which has an opening 41 therein adapted to fit over the neck 30 of the reproducer casing 19 and between the plate 31 and the top 29 of the casing. Said head 40 is provided with downwardly extending spring arms 42 and with upwardly extending spring arms 43, in the form shown there being three of the downwardly extending arms 42 and three of the upwardly extending arms 43 arranged alternately with respect to one another. The lower surface of the plate 31 is provided with corrugations as by the provision of a concentric set of recesses 44 as shown in Fig. 6, and the upwardly extending spring arms 43 are provided with lugs 45 entering said recesses 44, so that by turning the lever 39, which preferably projects forwardly upon the framework 16 beyond the turntable 10 where it is easily accessible, the plate 31 may be turned on its screw-threads and either raised or lowered with respect to the friction members 38. Ordinarily when the device is substantially accurately set a slight range of adjustment is sufficient for securing accurate governing and correct speed, and an indicator plate as 46 may be put under the lever 39, and pointer 47 thereof with indicia for indicating the direction of movement for the lever 39 to secure the kind of speed correction which is desired, as, for example, the word "Fast" may be placed at one end thereof, as indicated at 48, and the word "Slow" at the opposite end thereof, as indicated at 49, and movement of the lever 39 toward the left will cause the motor and turntable to speed up, whereas movement to the right will reduce its speed. Should a greater movement of the plate 31 be required than may be obtained directly by movement of the lever 39 within the limits provided, such movement may readily be obtained by forcibly adjusting the lever 39 with respect to the plate 31, which may be accomplished as by holding the plate 31 against rotation and at the same time forcibly turning the lever 39 with respect thereto, and the spring character of the arms 42 and 43 permits the same to yield so that the projections 45 may move with respect to the plate 31 and engage new recesses 44 therein, and by repeated partial turnings the plate 31 may be adjusted in either a forward or reverse direction within substantially any limits which may be desired.

It is to be understood that the embodiment shown is for illustration only, and that changes in and departures from such form may be resorted to within the scope of my claims and without departing from my invention or sacrificing any of its advantages.

Having thus described my invention, I claim:

1. In an electric motor phonograph, a turntable, a vertically arranged electric motor driving the turntable by friction drive, a plate movably supported on the motor casing, a governor on the motor shaft having means adapted to contact with said plate when rotated, and a lever between the friction plate and the motor casing, said lever being adapted to engage and adjust said plate when turned.

2. In an electric motor phonograph, a turntable, a vertically arranged motor driving the turntable by friction, speed governing means on the motor shaft and adjustable control means therefor, a lever normally having a fixed relation to said control means but adapted to be forcibly shifted with respect thereto.

3. In an electric motor for phonograph drive, a friction plate normally stationary but capable of adjustment by rotation, speed governing means rotating with the motor shaft and frictionally engaging said plate, and a lever normally having a fixed relation to said plate but adapted to be forcibly shifted with respect thereto.

4. In an electric motor for phonograph drive, a casing having a screw-threaded extension thereon, a plate screw-threaded on said extension, speed governing means rotatable with the motor shaft and frictionally engaging said plate, and a lever normally fixed to said plate but capable of being forcibly shifted with respect thereto.

5. In an electric motor for phonograph drive, the combination of a rotary speed governing member on the motor shaft, a friction plate having a screw-threaded mounting and adjustable thereby to and away from the rotary member, and a lever normally having a fixed relation to said plate but capable of being forcibly shifted with respect thereto.

6. A motor comprising a casing having a screw-threaded extension and a shaft passing substantially centrally through and out beyond said extension, a plate screw-threaded on said extension, a plurality of arms on said shaft beyond the plate, weights on the outer side of said arms away from said plate, and said arms being adapted to be brought toward said casing and into frictional contact with said plate by centrifugal force upon rotation of said shaft.

In testimony that I claim the foregoing, I hereto set my hand, this 29th day of December, 1916.

FRANK L. CAPPS.